United States Patent
Wada

(10) Patent No.: US 10,610,954 B2
(45) Date of Patent: Apr. 7, 2020

(54) WELDING APPARATUS AND PLASMA WELDING METHOD

(71) Applicant: TAIYO NIPPON SANSO CORPORATION, Tokyo (JP)

(72) Inventor: Katsunori Wada, Kai (JP)

(73) Assignee: TAIYO NIPPON SANSO CORPORATION, Tokyo (JP)

(*) Notice: Subject to any disclaimer, the term of this patent is extended or adjusted under 35 U.S.C. 154(b) by 296 days.

(21) Appl. No.: 15/533,176

(22) PCT Filed: Dec. 8, 2015

(86) PCT No.: PCT/JP2015/084369
§ 371 (c)(1),
(2) Date: Jun. 5, 2017

(87) PCT Pub. No.: WO2016/093216
PCT Pub. Date: Jun. 16, 2016

(65) Prior Publication Data
US 2017/0341174 A1    Nov. 30, 2017

(30) Foreign Application Priority Data
Dec. 8, 2014 (JP) ................. 2014-248013

(51) Int. Cl.
*B23K 10/00* (2006.01)
*B23K 10/02* (2006.01)
(Continued)

(52) U.S. Cl.
CPC ............ *B23K 10/02* (2013.01); *B23K 9/1068* (2013.01); *B23K 35/0261* (2013.01); *B23K 37/003* (2013.01)

(58) Field of Classification Search
CPC .... B23K 10/02; B23K 10/006; B23K 9/1068; B23K 35/0261; B23K 37/003; H05H 1/26; H05H 1/36; H05H 1/34
(Continued)

(56) References Cited

U.S. PATENT DOCUMENTS

| 4,803,405 A | 2/1989 | Nakano et al. |
| 6,025,570 A | 2/2000 | Fortain et al. |

(Continued)

FOREIGN PATENT DOCUMENTS

| CA | 2 321 629 | 4/2001 |
| JP | 49-011743 | 2/1974 |

(Continued)

OTHER PUBLICATIONS

International Search Report for PCT/JP2015/084369, dated Mar. 15, 2016, 5 pages.
(Continued)

*Primary Examiner* — Mark H Paschall
(74) *Attorney, Agent, or Firm* — Nixon & Vanderhye P.C.

(57) ABSTRACT

The object of the present invention is to provide a welding apparatus and a plasma welding method capable of obtaining deep penetration while suppressing initial investment in a welding apparatus. The welding apparatus of the present invention includes a torch for plasma welding and a power supply device, wherein the power supply device is composed of a first welding power supply used for a TIG welding apparatus, in which a positive terminal is electrically connected with the insert chip and a negative terminal is electrically connected with the electrode, and a second welding power supply used for a TIG welding apparatus, in which a positive terminal is electrically connected with a material to be welded and a negative terminal is electrically connected with the electrode.

11 Claims, 2 Drawing Sheets

(51) Int. Cl.
*B23K 9/10* (2006.01)
*B23K 35/02* (2006.01)
*B23K 37/00* (2006.01)

(58) Field of Classification Search
USPC ............ 219/121.46, 121.45, 121.39, 121.54, 219/121.5, 121.51, 121.52
See application file for complete search history.

(56) References Cited

U.S. PATENT DOCUMENTS

| | | | |
|---|---|---|---|
| 9,586,293 | B2 | 3/2017 | Wada et al. |
| 9,855,620 | B2 * | 1/2018 | Kooken ............... B23K 9/1075 |
| 10,086,465 | B2 * | 10/2018 | Peters ................. B23K 9/1006 |
| 2006/0289406 | A1 | 12/2006 | Helenius et al. |
| 2010/0258534 | A1 | 10/2010 | Hughes |
| 2011/0017712 | A1 | 1/2011 | Wada |
| 2016/0221108 | A1 | 8/2016 | Hoffa et al. |
| 2017/0087659 | A1 | 3/2017 | Wada et al. |

FOREIGN PATENT DOCUMENTS

| | | |
|---|---|---|
| JP | 49-32578 | 9/1974 |
| JP | 55-136567 | 10/1980 |
| JP | 56-126981 | 9/1981 |
| JP | 57-206572 | 12/1982 |
| JP | 62-244574 | 10/1987 |
| JP | 63-194867 | 8/1988 |
| JP | 64-075175 | 3/1989 |
| JP | 01-091971 | 4/1989 |
| JP | 02-070386 | 3/1990 |
| JP | 2001-105148 | 4/2001 |
| JP | 2003-112262 | 4/2003 |
| JP | 2009-233691 | 10/2009 |
| JP | 2013-043181 | 3/2013 |

OTHER PUBLICATIONS

International Search Report for PCT/JP2015/058206, dated Jun. 16, 2015, 4 pages.
U.S. Office Action issued in U.S. Appl. No. 15/126,382 dated Jan. 12, 2018.
Notice of Allowance issued in JP Appln. No. 2016-508783 dated Feb. 12, 2019 (w/ translation).
Notice of Allowance dated Sep. 11, 2018 issued in Japanese Application No. 2014-248013 with English translation (10 pages).
Office Action dated Sep. 11, 2018 issued in Japanese Application No. 2014-248013 with English translation (10 pages).

* cited by examiner

FIG. 2

| | PHOTOGRAPHS OF THE FRONT SIDE OF THE WELDED PLATE MATERIAL SUS 304 WHICH WAS USED AS A MATERIAL TO BE WELDED | PHOTOGRAPHS OF THE BACK SIDE OF THE WELDED PLATE MATERIAL SUS 304 WHICH WAS USED AS A MATERIAL TO BE WELDED |
|---|---|---|
| EXPERIMENTAL EXAMPLE | | |
| EXAMPLE 1 | | |
| EXAMPLE 2 | | |

WELDING APPARATUS AND PLASMA WELDING METHOD

TECHNICAL FIELD

The present invention relates to a welding apparatus and a plasma welding method.

This application is the U.S. national phase of International Application No. PCT/JP2015/084369 filed on Dec. 8, 2015 which designated the U.S. and claims priority to Japanese Patent Application No. 2014-248013, filed Dec. 8, 2014, the entire contents of each of which are incorporated herein by reference.

BACKGROUND ART

A TIG welding method and plasma welding method have conventionally been used as a non-consumable electrode-type welding method for welding a base material. Since the plasma welding method has superior heat-concentration compared to the TIG welding method, the plasma welding method enables high-speed welding with a narrow bead width and little distortion.

A plasma welding method includes a plasma arc-type (transferred plasma), a plasma jet-type (non-transferred plasma), and the like.

In general, plasma arc type welding apparatus (plasma arc type welding machine) includes a torch, a main power supply in which a negative terminal connects to an electrode constituting the torch and a positive terminal electrically connects with a material to be welded, a pilot arc power supply which is electrically connected to the power supply through a wire, a changing-over switch provided in a wire connecting the pilot arc power supply and an insert chip (may also be referred to as "restraint nozzle") constituting the torch, and a high-frequency device generating a pilot arc.

By using the plasma arc-type plasma welding apparatus, it is possible to perform high penetration welding.

In a plasma jet-type plasma welding apparatus (plasma jet-type plasma welding machine), an electrode constituting a torch is connected to a negative terminal of a main power supply, and a positive terminal of the main power supply and an insert chip constituting the torch are connected via the positive electrode.

In the plasma jet-type welding apparatus, since an electrical current does not flow through the material to be welded, it can be used as a heat source for thermal-spraying or a heat source for a furnace.

The combined-type plasma welding apparatus disclosed in Patent Document 1 includes a torch and a power supply device (hereinafter, may be referred to as "plasma power source device for a combined-type"). A combined-type plasma power supply device constitutes a main arc power supply (may be referred to as "main power supply"), a pilot arc power supply, and a high-frequency device.

In the main arc power supply (main power supply), the negative terminal is connected with the electrode constituting the torch, and the positive terminal is electrically connected with the material to be welded.

The combined-type plasma welding apparatus having the above-described constitution makes it possible to obtain a stable plasma even with a very low electrical current, thereby allowing welding of a hyper-thin plate, which is difficult to weld by the TIG welding method.

PRIOR ART LITERATURE

Patent Documents

Patent document 1: Japanese Unexamined Patent Application Publication No. Sho 63-194867

DISCLOSURE OF INVENTION

Problems to be Solved by the Invention

As the power supply device (hereinafter, may be referred to as "power supply device for TIG") of the TIG welding apparatus (TIG welding machine), a welding power supply and a high-frequency device have been used in combination and this combination is very simple and convenient.

In addition, the non-load voltage of the power supply device for TIG is just a fraction of the non-load voltage of the plasma power supply device. For this reason, a power supply device for TIG, which is low cost, cannot be used for plasma welding just by substituting it with the plasma power supply device.

Therefore, the high cost of the plasma power supply device, which is higher than the cost of the power supply device for TIG, is a factor that raises the cost of the plasma welding apparatus.

Therefore, even though such a plasma welding apparatus enables deep welding penetration, such an apparatus has not been easy to use due to the high cost of the initial investment.

Therefore, the objective of the present invention is to provide a welding apparatus and a plasma welding method capable of obtaining deep penetration, while reducing the initial investment cost.

Means for Solving the Problems

In order to solve the objective, the invention of No. 1 provides a welding apparatus comprising a torch for plasma welding and a power supply device,
wherein
the torch for plasma welding is composed of
an electrode,
an insert chip which is arranged to surround an outer periphery of the electrode,
a center gas supply flow path which is arranged between the electrode and the insert chip to supply a center gas,
a shield cap which is arranged to surround an outer periphery of the insert chip, and
an outer gas supply flow path which is arranged between the shield cap and the insert chip to supply an outer gas; and
wherein
the power supply device is composed of
a first welding power supply used for a TIG welding apparatus, in which a positive terminal is electrically connected with the insert chip and a negative terminal is electrically connected with the electrode, and
a second welding power supply used for a TIG welding apparatus, in which a positive terminal is electrically connected with a material to be welded and a negative terminal is electrically connected with the electrode.

In addition, the invention of No. 2 provides the welding apparatus according to the invention of No. 1, wherein
the first welding power supply includes a high-frequency device and a high-voltage device, the second power supply provides a welding current only while a welding current is supplied from the first welding power supply, and the second power supply includes a high-frequency device and high-voltage device.

In addition, the invention of No. 3 provides the welding apparatus according to the invention of No. 1 or 2, wherein the first power supply and the second power supply are the same type.

In addition, the invention of No. 4 provides the welding apparatus according to the invention of No. 1 or 2, wherein the first power supply and the second power supply are the different types.

In addition, the invention of No. 5 provides the welding apparatus according to any one of the inventions No. 1 to 4, wherein the insert chip includes a cooling water flow path for passing cooling water that cools the electrode.

In addition, the invention of No. 6 provides a plasma welding method, comprising a plasma jet arc-generating step and a welding step, wherein in the plasma jet arc-generating step, a current is supplied from a first power supply, which is a welding power supply used for a TIG welding apparatus, and in which a positive terminal is electrically connected with an insert chip of a torch for plasma welding and a negative terminal is electrically connected with an electrode of the torch for plasma welding, thereby generating a non-transferred plasma jet arc between the electrode and the insert chip, and in the welding step, a current is supplied from a second power supply, which is a welding power supply used for a TIG welding apparatus, and in which a positive terminal is electrically connected with a material to be welded and a negative terminal is electrically connected with the electrode, while generating a transferred plasma arc between the material to be welded and the electrode, thereby welding the material to be welded.

In addition, the invention of No. 7 provides a plasma welding method, comprising a plasma jet arc-generating step and a welding step, wherein in the plasma jet arc-generating step, a current is supplied from a first power supply, which is a welding power supply used for a TIG welding apparatus, and in which a positive terminal is electrically connected with an insert chip of a torch for plasma welding and a negative terminal is electrically connected with an electrode of the torch for plasma welding, thereby generating a non-transferred plasma jet arc between the electrode and the insert chip, and in the welding step, a current is supplied from a second power supply, which is a welding power supply used for a TIG welding apparatus, and in which a positive terminal is electrically connected with a material to be welded and a negative terminal is electrically connected with the electrode, while generating a transferred plasma arc between the material to be welded and the electrode by a high-frequency-start-type high-frequency device constituting the second welding power supply or by a high-voltage-start-type high-voltage device constituting the second welding power supply instead of the high-frequency device, thereby welding the material to be welded.

In addition, the invention of No. 8 provides the plasma welding method according to the invention of No. 6 or 7, wherein in the welding step, the material to be welded is welded in a state where the generation of the plasma jet arc is maintained.

In addition, the invention of No. 9 provides the welding method according to any one of the inventions of No. 6 to 8, wherein the plasma jet arc is generated by supplying a current of 4 A to 500 A from the first welding power supply.

Effects of the Invention

According to the present invention, it is possible to obtain deep penetration while reducing the cost of initial investment in a welding apparatus.

BRIEF DESCRIPTION OF THE DRAWINGS

FIG. 2 shows the front and back sides of the plate materials of SUS304 welded under the conditions of Experimental Example, Example 1, and Example 2.

BEST MODE FOR CARRYING OUT THE INVENTION

Figure 1:
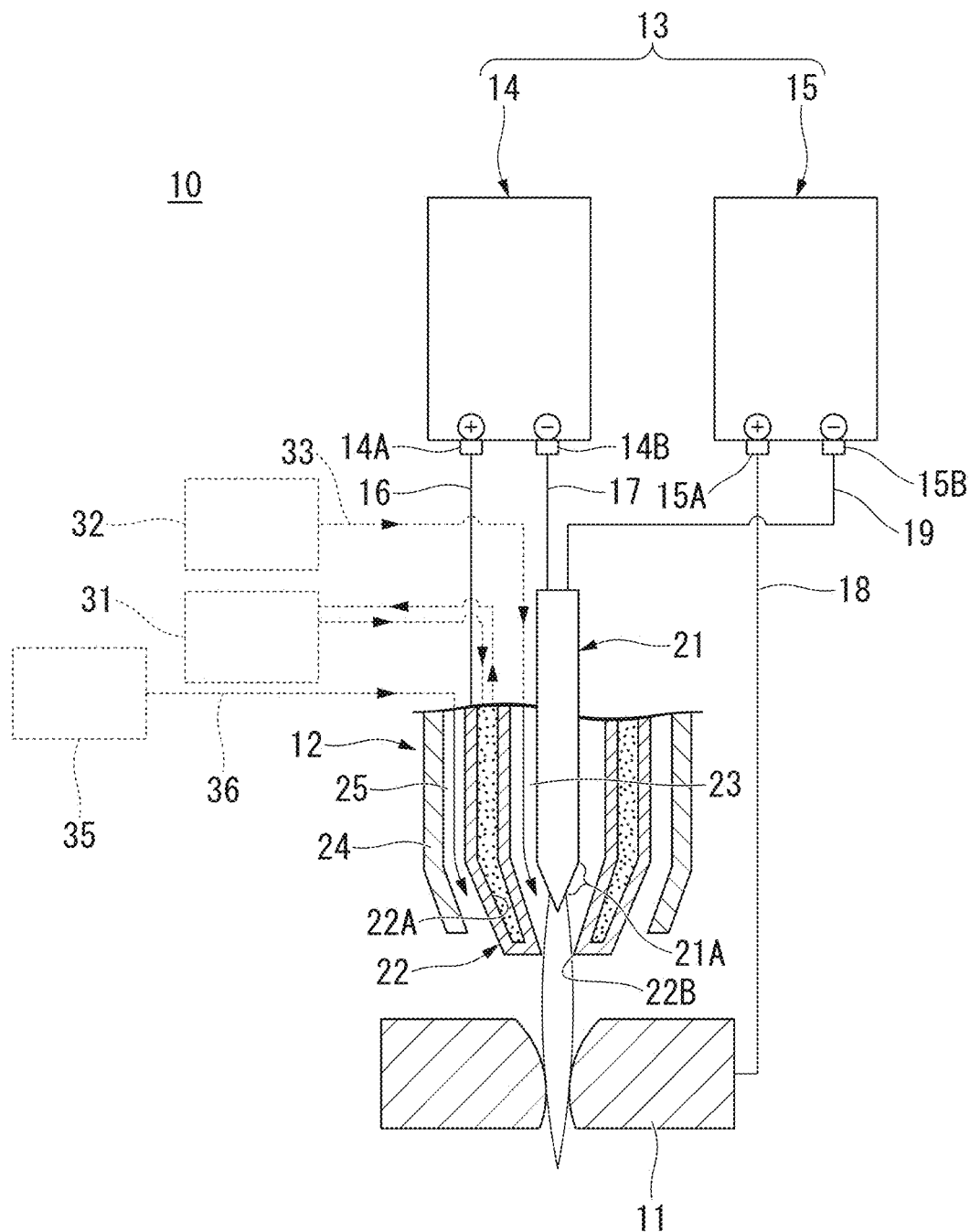
FIG. 1 schematically shows the configuration of an embodiment of the welding apparatus of the present invention.

The embodiments of the present invention will be explained below in detail referring to the figures. The figures used in the following explain the configuration of the embodiment of the present invention, although the size, thickness, dimension or the like may be different from the dimensions of the actual welding apparatus.

Embodiment

FIG. 1 is a view schematically showing a schematic configuration of a welding apparatus according to an embodiment of the present invention. In FIG. 1, the insert chip 22 and the shield cap 24 constituting the torch for plasma welding 12 are shown in cross section. Further, in FIG. 1, components other than those of the welding apparatus 10 are illustrated by dotted lines.

Referring to FIG. 1, the welding apparatus 10 of the present embodiment includes a torch for plasma welding 12, a power supply device 13, and wires 16 to 19.

The torch for plasma welding 12 has an electrode 21, an insert chip 22, a center gas supply flow path 23, a shield cap 24, and an outer gas supply flow path 25.

The electrode 21 is a non-consumable electrode extending in one direction and has a distal end portion 21A having a sharp-pointed shape. The distal end portion 21A is completely housed in the insert chip 22. The electrode 21 is made of a metal material having a high melting point.

As a material of the electrode 21, for example, a material obtained by adding an oxide (for example, thorium oxide, lanthanum oxide, cerium oxide, yttrium oxide, zirconium oxide or the like) to tungsten or tungsten can be used.

The insert chip 22 is a tubular-shaped member disposed such that it surrounds the outer periphery of the electrode 21 so that a gap is interposed between the insert chip 22 and the electrode 21 (in other words, so that the center gas supply flow channel 23 can be formed).

The insert chip 22 has a cooling water flow path 22A through which cooling water can be supplied. The cooling water flow path 22A is connected to a cooling water circulation part 31 which supplies cooling water for cooling the electrode 21 into the cooling water flow path 22A and recovers cooling water contributing to cooling of the electrode 21.

The shape of the tip portion of the insert tip 22 is formed in a shape that is reduced in diameter with respect to the direction from the base end toward the tip of the insert tip 22.

The tip of the insert chip 22 includes an insert tip hole 22B for ejecting a plasma arc generated from the electrode 21 to the outside of the insert chip 22.

Since the plasma arc generated at the electrode 21 receives the wall effect and thermal pinch effect by the insert chip 22, it is throttled and becomes an arc with a high energy density and is ejected from the insert tip hole 22B.

The center gas supply flow path 23 is a substantially tubular space partitioned by the outer surface of the electrode 21 and the inner surface of the insert chip 22. The center gas supply flow path 23 is connected to the center gas supply source 32 via the center gas supply line 33.

When the center gas is supplied from the center gas supply source 32 to the center gas supply flow path 23, the center gas is supplied to the front end portion 21A of the electrode 21. As the center gas, for example, an inert gas such as argon gas or the like can be used.

Although not shown in FIG. 1, a flow meter for measuring the flow rate of the center gas and a flow rate-adjusting valve for adjusting the flow rate of the center gas are provided in the center gas supply line 33.

The shield cap 24 is a tubular-shaped member disposed such that it surrounds the outer periphery of the insert chip 22 so that a gap is interposed between the shield cap 24 and the insert chip 22 (in other words, so that the outer gas supply flow channel 25 can be formed). The shape of the distal end portion of the shield cap 24 is formed into a reduced diameter shape.

The outer gas supply flow path 25 is a substantially tubular space partitioned by the outer surface of the insert chip 22 and the inner surface of the shield cap 24. The outer gas supply flow path 25 is connected to the outer gas supply source 35 via the outer gas supply line 36.

When the outer gas is supplied from the outer gas supply source 35 to the outer gas supply flow path 25, the outer gas is supplied to the tip side of the torch for plasma welding 12.

As the outer gas, for example, a simple substance of an inert gas such as argon gas or helium gas, a mixed gas obtained by mixing an argon gas and hydrogen gas, a mixed gas obtained by mixing an argon gas and helium gas, a mixed gas obtained by mixing an argon gas, helium gas and hydrogen gas, a mixed gas obtained by mixing an argon and oxidizing gas composed of oxygen or carbon dioxide, a mixed gas obtained by mixing nitrogen with an inert gas such as argon or helium, or the like can be used.

Although not shown in FIG. 1, a flow meter for measuring the flow rate of the outer gas and a flow rate-adjusting valve for adjusting the flow rate of the outer gas are provided in the outer gas supply line 36.

The power supply device 13 is composed of a first welding power supply 14 and a second welding power supply 15 which is a power supply for supplying a welding current only while a welding current is being supplied from the first welding power supply 14.

The first welding power supply 14 is configured to include a high-frequency device or a high-voltage device. The second welding power supply 15 is configured to include a high-frequency device or a high-voltage device.

The power supply device 13 may be composed of a first welding power supply 14 having a high-frequency device and a second welding power supply 15 having a high-frequency device. That is, the same type of welding power supplies may be used as the first and second welding power supplies 14, 15.

In this case, it is possible to use the same type of welding power supply as the first and second welding power supplies 14, 15. Thus, common parts can be used, and it is possible to easily manage the standby power supply when the first and second welding power supplies 14, 15 fail.

Further, by using the same type of welding power supply as the first and second welding power supplies 14, 15, the operation method of the welding power supply becomes the same, so that erroneous operation of the first and second welding power supplies 14, 15 can be suppressed The power supply device 13 may be composed of a first welding power supply 14 having a high-voltage device and a second welding power supply 15 having a high-voltage device. That is, the same type of welding power supplies may be used as the first and second welding power supplies 14, 15.

In this case, the same effect as when the same high-frequency devices are used as the first and second welding power supplies 14, 15 can be obtained.

Further, the power supply device 13 may be composed of a first welding power supply 14 having a high-frequency device and a second welding power supply 15 having a high-voltage device, or alternatively, composed of a first welding power supply 14 having a high-voltage device and a second welding power supply 15 having a high-frequency device. That is, different types of welding power supplies may be used as the first and second welding power supplies 14, 15.

As described above, the power supply device 13 includes the first welding power supply 14, and the second welding power supply 15 which is a power supply for supplying the welding current only while the welding current is being supplied from the first welding power supply 14.

On the other hand, the high-frequency device constituting the conventional plasma power supply device has a high-frequency device or a high-voltage device used only for generating a pilot arc.

That is, in the conventional plasma welding power supply, a pilot arc is generated by the pilot arc power supply and the high-frequency device, and the main arc is transferred between the electrode and the base material by being guided by the pilot arc.

Therefore, in the conventional plasma power supply device, a high-frequency device is not used for main arc generation. On the other hand, in the present invention, for example, when the first and second welding power supplies 14, 15 have a high-frequency device, a pilot arc is generated by the high-frequency device constituting the first welding power supply, and thereafter the pilot arc, as a main arc, can be more reliably transferred (transfer-type) to the base material from the electrode by the high-frequency devices (two high-frequency devices) constituting the first and second welding power supplies.

That is, in the present invention, by using the high-frequency device provided in the first and second welding power supplies 14, 15, the pilot arc can be smoothly shifted to the main arc.

The first welding power supply 14 is not an ordinary conventional plasma power supply device (specifically, a power supply device including a plasma arc power supply, a pilot arc power supply, and a high-frequency device) but an inexpensive welding power supply used in a general TIG welding apparatus.

As the first welding power supply 14, for example, a high-frequency device for arc formation, a high-voltage device for arc formation, or a welding power supply capable of adjusting direct current output, initial current, crater current, gas pre-flow time, gas after-flow time, current upslope time, current down slope time, pulse frequency, pulse width, etc., can be used.

As the specifications of the first welding power supply 14, for example, a DC output current of 4 A to 500 A, an initial current of 10 A to 500 A, a crater current of 10 A to 500 A, a gas pre-flow time of 0 seconds to 30 seconds, a gas after-flow time of 0 to 30 seconds, an upslope time of 0 seconds to 10 seconds, a current output of 0 seconds to 10 seconds, a downslope time of 0 seconds to 10 seconds, a current output 0 second to 10 seconds, a pulse frequency 0.1 Hz to 500 Hz and a pulse width of 5% to 95%, can be adopted.

As the first welding power supply 14, for example, a welding power supply for both direct and alternating current may be used. In this case, only the direct current function of the welding power supply for both the direct and alternating current is used.

The first welding power supply 14 includes a positive terminal 14A and a negative terminal 14B. The positive terminal 14A is connected to one end of the wire 16. The positive terminal 14A is electrically connected to the insert chip 22 via the wire 16.

The negative terminal 14B is connected to one end of the wire 17. The negative terminal 14B is electrically connected to the electrode 21 via the wire 17.

The first welding power supply 14 configured as described above functions as a welding power supply for non-transfer-type plasma welding.

The second welding power supply 15 is not an ordinary conventional plasma power supply device (specifically, a power supply device including a plasma arc power supply, a pilot arc power supply, and a high-frequency device) but an inexpensive welding power supply used in a general TIG welding apparatus.

As the first welding power supply 15, the same as the first welding power supply 14 described above (specifically, a high-frequency device for arc formation, a high-voltage device for arc formation, or a welding power supply capable of adjusting direct current output, initial current, crater current, gas pre-flow time, gas after-flow time, current upslope time, current down slope time, pulse frequency, pulse width, etc. and the values thereof being the same as described above), can be used.

As the second welding power supply 15, for example, a welding power supply for both direct and alternating current may be used. In this case, when stainless steel, iron, or the like is used as the material to be welded 11, welding is performed using only the direct current function of the welding power supply for both direct and alternating current. The alternating current function is used when welding of aluminum, copper alloy, etc.

The second welding power supply 15 includes a positive terminal 15A and a negative terminal 15B. The positive terminal 15A is connected to one end of the wire 18. The positive terminal 15A is electrically connected to the material to be welded 11 via the wire 18.

The negative terminal 15B is connected to one end of the wire 19. The negative terminal 15B is electrically connected to the electrode 21 via the wire 19.

The second welding power supply 15 configured as described above functions as a welding power supply when carrying out transfer-type plasma welding.

As the power supply device 13 (the welding power supply including the first and second welding power supplies 14, 15) having the above-described configuration, for example, a welding power supply having a price of approximately $1/10$ to $1/3$ of the price of a general conventional plasma power supply device can be used. Thereby, it is possible to reduce the cost of the welding apparatus 10.

In this way, by using the power supply device 13 which is less expensive than a general conventional plasma power supply device (specifically, a power supply device including a plasma arc power supply, a pilot arc power supply, and a high-frequency device), a synergistic effect of a plasma jet arc generated by a current supplied from the power supply 14 and a plasma arc generated by a current supplied from the second welding power supply 15 is produced, thereby making it possible to increase the penetration depth of the material to be welded 11. As a result, a penetration depth equal to or higher than that of the conventional plasma welding apparatus can be obtained, and the welding speed can be improved.

In the welding apparatus 10 of the present embodiment, the first welding power supply 14 and the second welding power supply 15 are installed, and the electric energy supplied from the first and second welding power supplies 14, 15 is combined to weld the base material.

In addition, depending on the base material to be welded and the welding conditions, it is sometimes necessary to supply more welding current, but in the present invention, even in such a case, it is possible to meet the need by freely combining general-purpose TIG welding power supplies.

Moreover, by constantly using a high-frequency device which is standardly installed in a general-purpose TIG welding power supply, it is possible to stably maintain the generation of main arc.

That is, according to the present invention, a necessary penetration depth can be secured by a synergistic effect of the non-transfer-type and the transfer-type. Further, by setting the welding current to be higher, penetration deeper than conventional plasma welding can be obtained and a high-speed welding operation can be realized.

On the other hand, in the conventional plasma arc-type welding apparatus, only the electric energy from the main power supply is used for welding the base material, and when more welding current supply is required depending on the welding base material and welding conditions, it is necessary to have an additional welding power supply.

The welding apparatus of this embodiment includes a torch for plasma welding 12 and a power supply device 13 composed of a first welding power supply 14 used for a TIG welding apparatus and a second welding power supply 15 used for a TIG welding apparatus. In the first welding power supply 14, a positive terminal 14A is electrically connected to an insert chip 22 and a negative terminal 14B is electrically connected to an electrode 21, and in the second welding power supply 15, a positive terminal 15A is electrically connected to the material to be welded 11 and a negative terminal 15B is connected to an electrode 21.

Therefore, by using the power supply device 13 which is less expensive than the expensive power supply device of the conventional plasma welding apparatus, a synergistic effect of a plasma jet arc generated by a current supplied from the power supply 14 and a plasma arc generated by a current supplied from the second welding power supply 15 is produced, thereby making it possible to increase the penetration depth of the material to be welded 11.

As a result, a penetration depth equal to or higher than that of the conventional plasma welding apparatus can be obtained while reducing the cost of initial investment in the welding apparatus 10.

In addition, the welding apparatus 10 configured as described above can be used for non-keyhole welding, keyhole welding, or the like.

Next, referring to FIG. 1, a first plasma welding method using the welding apparatus 10 of the present embodiment will be described.

The first plasma welding method of the present embodiment includes a plasma jet arc-generating step and a welding step, wherein in the plasma jet arc-generating step, a current is supplied from a first power supply 14, which is a welding power supply used for a TIG welding apparatus, and in which the positive terminal 14B is electrically connected with an insert chip 22 of a torch for plasma welding 12 and the negative terminal 14B is electrically connected with the electrode 21 of the torch 22 for plasma welding 12, thereby generating a non-transferred plasma jet arc between the electrode 21 and the insert chip, and in the welding step, a current is supplied from the second power supply 15, which is a welding power supply used for a TIG welding apparatus, and in which the positive terminal 15A is electrically connected with the material to be welded 11 and the negative terminal 15B is electrically connected with the electrode 21, while generating a transferred plasma arc between the material to be welded 11 and the electrode 21, thereby welding the material to be welded 11.

In the plasma jet arc generation step, first, the center gas is supplied to the center gas supply flow path 23. As the center gas, the above-mentioned gas can be used.

Although the flow rate of the center gas can be appropriately selected according to the purpose, it can be set, for example, within the range of 0.1 to 5 L/min.

In this case, the outer gas may be, or may not be supplied to the outer gas supply flow path 25.

Next, a current is supplied between the electrode 21 and the insert chip 22 using the first welding power supply 14, so that a non-transfer-type plasma jet arc is generated below the tip portion 21A of the electrode 21.

At this time, the magnitude of the current supplied between the electrode 21 and the insert chip 22 by the first welding power supply 14 may be appropriately selected, for example, within a range of 4 A to 500 A according to the performance of the welding power supply.

If the magnitude of the current supplied between the electrode 21 and the insert chip 22 by the first welding power supply 14 is smaller than 4 A, the pilot arc may become unstable. On the other hand, if the magnitude of the current supplied between the electrode 21 and the insert chip 22 by the first welding power supply 14 is larger than 500 A, the first welding power supply 14 cannot cope with a TIG welding power supply which is sold at a low price, resulting in an increase in cost.

Therefore, by setting the magnitude of the current supplied between the electrode 21 and the insert chip 22 to 4 A or more and 500 A or less, the introduction cost of the welding power supply 14 can be suppressed.

Further, the current supplied by the first welding power supply 14 is preferably, for example, 20 A or more and 500 A or less.

In this manner, by setting the current supplied from the first welding power supply 14 to 20 A or more and 500 A or less, the plasma jet arc can be stabilized and deeper penetration can be obtained.

In the welding step, the outer gas will be supplied to the outer gas supply flow path 25 if the outer gas is not supplied to the outer gas supply flow path 25 in the plasma jet arc generation step.

If the outer gas is supplied to the outer gas supply flow path 25 in the plasma jet arc generation step, the supply of the outer gas will be continued in the welding step. The outer gas has a function of shielding the molten portion from the atmosphere.

Next, the welding step will be explained using an example in which the material to be welded 11 is welded using a plasma jet arc and a plasma arc.

In this case, a plasma jet arc and a plasma arc are generated by supplying a current between the electrode 21 and the material to be welded 11 from the second welding power supply 15 in a state where the generation of plasma jet ark is continuous (the supply of the current from the first welding power supply 14 is continuous), thereby welding the material to be welded 11.

At this time, the current supplied by the second welding power supply 15 may be smaller or larger than the current supplied by the first welding power supply 14.

In the welding step, the current supplied by the second welding power supply 15 can be appropriately selected, for example, within a range of 4 A to 500 A.

In the welding process, it is also possible to weld the material to be welded 11 using only the plasma arc.

In this case, the supply of the outer gas is maintained, the current is supplied between the electrode 21 and the material to be welded 11 from the second welding power supply 15, and then the material to be welded 11 is welded only with the plasma arc in as state where the generation of the plasma jet arc is stopped (the supply of the current from the welding power supply 14 is stopped).

In this welding step, the current supplied by the second welding power supply 15 can be appropriately selected within a range of 4 A to 500 A.

In the case where the material of the material to be welded 11 is an aluminum alloy, a Cu alloy, or the like, a cleaning process is necessary. Therefore, the current supplied by the second welding power supply 15 is preferably an alternating current arc waveform.

The "cleaning process" here means a process of removing the oxide film on the surface of the base material by collision of plus ions. In the cleaning process, if the electrode side is made positive, the electrode will be consumed, and thus it is not possible to use a direct current power supply (positive electrode) as the second welding power supply 15. Therefore, by using an alternating current with arc waveform as the current supplied by the second welding power supply 15, it is possible to remove the oxide film while suppressing the consumption of the electrode.

The welding apparatus 10 may be used for preheating a base material requiring preheating by using only the first welding power supply 14 without using the second welding power supply 15, and after reaching the temperature, it may be shifted to the main arc by using the second welding power supply 15. In addition, the welding apparatus may be used for welding, brazing, soldering, thermal spraying, etc., or even used as a heat source (for example, heat source of a furnace, heat source of post heat treatment, heat source of thermal processing of glass, or other heat sources).

In addition, a plasma torch with the constitution of a general-purpose TIG torch (for example, the torch disclosed in Japanese Patent Application No. 2014-056528) may be used.

It can also be used for TIG welding by using only the second welding power supply 15 to make the insert chip hole 22B of the torch for plasma welding 12 larger than the electrode 21 and projecting the electrode 21 from the tip of the insert chip 22B. A TIG welding torch may be used instead of the torch for plasma welding 12.

According to the first plasma welding method of this embodiment, by including the above-described plasma jet arc generation step and the welding step of welding the material to be welded 11, it is possible to use the power supply apparatus 13 which is less expensive than the expensive power supply apparatus of the conventional plasma welding apparatus. In addition, due to the synergistic effect of the plasma jet arc generated by the current supplied from the first welding power source 14 and the plasma arc generated by the current supplied from the second welding power source 15, it is possible to increase the penetration depth of the material to be welded 11. That is, the current (electric energy) supplied from the first welding power supply 14 can be utilized for stabilizing the transition of the main arc.

Therefore, it is possible to obtain a penetration depth equal to or higher than that of the conventional plasma welding apparatus, while suppressing the initial investment in the welding apparatus 10.

Although the DC power supply for a pilot arc disclosed in Patent Document 1 supplies a current for arc generation, since the current is generally low current, it cannot contribute to stable transition of a main arc as the first welding power supply 14 described in the present embodiment does.

Next, referring to FIG. 1, a second plasma welding method using the welding apparatus 10 of this embodiment will be described.

The second plasma welding method of the present embodiment includes a plasma jet arc-generating step and a welding step, wherein in the plasma jet arc-generating step, a current is supplied from a first power supply 14, which is a welding power supply used for a TIG welding apparatus, and in which a positive terminal 14A is electrically connected with an insert chip 22 of a torch for plasma welding 12 and a negative terminal 14B is electrically connected with an electrode 21 of the torch for plasma welding 12, thereby generating a non-transferred plasma jet arc between the electrode 21 and the insert chip 22, and in the welding step, a current is supplied from a second power supply 15, which is a welding power supply used for a TIG welding apparatus, and in which a positive terminal 15A is electrically connected with a material to be welded 11 and a negative terminal 15B is electrically connected with the electrode 21, while generating a transferred plasma arc between the material to be welded 11 and the electrode 21 by a high-frequency-start-type high-frequency device constituting the second welding power supply 15 or by a high-voltage-start-type high-voltage device constituting the second welding power supply 15 instead of the high-frequency device, thereby welding the material to be welded 11.

In the present invention, the term "high-frequency start-type" refers to a start method using a high frequency at the time of arc start and the term "high-voltage start-type" refers to a start method using a high voltage at the time of arc start.

In the second plasma welding method of the present embodiment, the same effect as the first plasma welding method can be obtained, because the same method as the first plasma welding method is applied except that in the welding process, the welding of the material to be welded 11 is performed by generating a transitional-type plasma arc between the material to be welded 11 and the electrode 21 by using a high-frequency start-type high-frequency device constituting the second welding power supply 15 or a high-voltage start-type high-voltage device constituting the second welding power supply 15 instead of the high-frequency device.

Further, in the second plasma welding method of the present embodiment, even if the value of the current supplied from the first welding power supply 14 is small (for example, approximately 5 A), a stable main arc transition can be realized by using a high-frequency device or a high-voltage device constituting the second welding power supply 15, and this is the difference from the first plasma welding method described above.

In the second plasma welding method, a stable main arc transition is performed by using a high-frequency device or a high-voltage device constituting the second welding power supply 15, and in the first plasma welding method, a current (electric energy) supplied from the first welding power supply 14 is used in order to stably perform the main arc transition.

Although the preferred embodiments of the present invention have been described in detail above, the present invention is not limited to such specific embodiments, and within the scope of the gist of the present invention described in the Claims, various modifications and changes are possible.

Although Examples and Comparative Examples will be described below, the present invention is not limited to the following Examples.

EXPERIMENTAL EXAMPLE

In Experimental Example, the welding apparatus 10 shown in FIG. 1 was used and a plate material of SUS 304 having a thickness of 3 mm was used as the material to be welded 11. An arc was ejected onto the plate material of SUS 304 and the torch for plasma welding 12 was moved in a predetermined direction, thereby welding the material to be welded 11.

Specifically, in the Experimental Example, a plasma jet arc was generated by supplying a current of 20 A from the first welding power supply 14. Next, a current of 100 A was supplied from the second welding power supply 15, and after 1 second had elapsed, the supply of the current from the first welding power supply 14 was stopped, and the plasma arc of the second welding power supply was jetted to the plate material of the SUS304, thereby welding the material to be welded 11. However, there was a case where the plasma arc could not be maintained during welding.

The configuration of the welding apparatus 10 is as follows.

As the first welding power supply 14 constituting the power supply device 13, YC-300 BP 4 (model number), which is a welding power supply for TIG manufactured by Panasonic Corporation, was used. As the second welding power supply 15 constituting the power supply device 13, YC-500 BP 4 (model number), which is a welding power supply for TIG manufactured by Panasonic Corporation, was used.

Assuming that the power supply device (output current range is 10 to 350 A class) used in a general plasma welding apparatus is 3.5 million yen, the power supply device 13 (power supply device composed of the first and second welding power supplies 14 and 15) was approximately one half of that of the power supply device used in the plasma welding apparatus.

As the electrode 21, a tungsten electrode having an outer diameter of 3.2 mm was used. The tip of the electrode 21 was disposed 5 mm inside from the tip of the insert chip 22. The diameter of the insert tip hole 22B of the insert chip 22 was 3.5 mm.

In addition, the following conditions were applied as the welding conditions.

As the center gas to be supplied to the center gas supply flow path 23, an argon gas containing 7% of $H_2$ was used and the flow rate was 3 L/min. As the outer gas, an argon gas containing 7% of $H_2$ was used and the flow rate was 7 L/min.

In addition, the moving speed of the torch for plasma welding 12 was 45 cm/min. The section to be welded was set to 10 cm.

Thereafter, the states of the front and back surfaces of the welded material 11 were observed and photographed with a camera. The photographs taken at this time are shown in FIG. 2.

FIG. 2 shows photographs of the front and back surfaces of the plate material when welding the plate material of SUS 304 under the conditions of the Experimental Example and Examples 1 and 2.

Table 1 shows the evaluation results of penetration depth evaluated according to the photographs shown in FIG. 2.

In Table 1, "A" shows that penetration depth is fairly deep and back beads are continuous and clear, "B" shows that penetration depth is slightly shallow and back beads partially appeared, and "C" shows that it was difficult to maintain the arc during the welding process.

TABLE 1

| | Evaluation of Penetration Depth |
|---|---|
| Experimental Example | C |
| Example 1 | B |
| Example 2 | A |

Example 1

In Example 1, the same apparatus as the welding apparatus 10 used in the above Experimental Example was used, and welding was carried out by supplying a current of 100 A from the second welding power supply 15 while supplying a current of 20 A from the first welding power supply 14. In Example 1, the same welding conditions as in the experimental example were applied except that in Example 1, an on-state of the first welding power supply 14 was continued.

After the welding treatment, the condition of the front surface and back surface of the welded material 11 was observed.

The results are shown in Table 1. In Example 1, a stable arc was obtained until the end.

Example 2

In Example 2, the same apparatus as the welding apparatus 10 used in the Experimental Example described above was used and the current supplied from the first welding power supply 14 was changed to 100 A, and welding was carried out by supplying 100 A of current from the second welding power supply 15 while supplying 100 A of current from the first welding power supply 14. In Example 2, the same process as in Example 1 was carried out except that the current supplied from the first welding power supply 14 was changed to 100 A.

After the welding treatment, the condition of the front surface and back surface of the welded material 11 was observed.

The results are shown in Table 1. In Example 2, as in Example 1, a stable arc was obtained until the end, a deeper penetration was obtained, and very good results were obtained.

Summary of Experimental Examples and Results of Examples 1 and 2

The results showed that in the case where a general-purpose TIG welding power supply is used, if welding of the material to be welded 11 with a welding current is supplied from the second welding power supply 15 in a state where no welding current is supplied from the first welding power supply 14, it was difficult to maintain the arc generation.

The results showed that if welding the material to be welded 11 with a welding current supplied from the second welding power supply 15 in a state where a welding current is supplied from the first welding power supply 14, it is possible to maintain the arc generation.

In addition, from the results, it can be confirmed that a deeper penetration depth can be obtained by turning on the first and second welding power supplies 14, 15 and increasing the current supplied from the first and second welding power supplies 14, 15.

INDUSTRIAL APPLICABILITY

The present invention is applicable to a welding apparatus and a welding method capable of obtaining deep penetration while reducing the cost of initial investment in a welding apparatus.

DESCRIPTION OF THE REFERENCE NUMERALS

10 . . . welding apparatus, 11 . . . material to be welded, 12 . . . torch for plasma welding,
13 . . . power supply device, 14 . . . first welding power supply, 14A, 15A . . . positive terminal,
14B, 15B . . . negative terminal, 15 . . . second welding power supply, 16-19 . . . wire,
21 . . . electrode, 21A . . . distal end portion, 22 . . . insert chip,
22A . . . cooling water flow path, 22B . . . hole of insert chip,
23 . . . center gas supply flow path, 24 . . . shield cap,
25 . . . outer gas supply flow path, 31 . . . cooling water circulation member,
32 . . . center gas supply source, 33 . . . center gas supply line,
35 . . . outer gas supply source, 36 . . . outer gas supply line

The invention claimed is:
1. A welding apparatus comprising a torch for plasma welding and a power supply device,
wherein
the torch for plasma welding is composed of
an electrode,
an insert chip which is arranged to surround an outer periphery of the electrode,
a center gas supply flow path which is arranged between the electrode and the insert chip to supply a center gas,
a shield cap which is arranged to surround an outer periphery of the insert chip, and
an outer gas supply flow path which is arranged between the shield cap and the insert chip to supply an outer gas; and wherein
the power supply device is composed of
a first welding power supply used for a TIG welding apparatus, in which a positive terminal is electrically connected with the insert chip and a negative terminal is electrically connected with the electrode, and
a second welding power supply used for a TIG welding apparatus, in which a positive terminal is electrically connected with a material to be welded and a negative terminal is electrically connected with the electrode.

2. The welding apparatus according to claim 1, wherein
the first welding power supply includes a high-frequency device and a high-voltage device,
the second power supply provides a welding current only while a welding current is supplied from the first welding power supply, and
the second power supply includes a high-frequency device and high-voltage device.

3. The welding apparatus according to claim 1, wherein the first power supply and the second power supply are the same type.

4. The welding apparatus according to claim 1, wherein the first power supply and the second power supply are the different types.

5. The welding apparatus according to claim 1, wherein the insert chip includes a cooling water flow path for passing cooling water that cools the electrode.

6. A plasma welding method comprising operating a welding apparatus according to claim 1 comprising a plasma jet arc-generating step and a welding step, wherein
in the plasma jet arc-generating step, a current is supplied from the first power supply, which is the welding power supply used for the TIG welding apparatus, and in which ache positive terminal is electrically connected with the insert chip of the torch for plasma welding and the negative terminal is electrically connected with the electrode of the torch for plasma welding, thereby generating a non-transferred plasma jet arc between the electrode and the insert chip, and
in the welding step, a current is supplied from the second power supply, which is the welding power supply used for the TIG welding apparatus, and in which the positive terminal is electrically connected with the material to be welded and the negative terminal is electrically connected with the electrode, while generating a transferred plasma arc between the material to be welded and the electrode, thereby welding the material to be welded.

7. A plasma welding method comprising operating a welding apparatus according to claim 1, comprising a plasma jet arc-generating step and a welding step, wherein
in the plasma jet arc-generating step, a current is supplied from the first power supply, which is the welding power supply used for the TIG welding apparatus, and in which the positive terminal is electrically connected with the insert chip of the torch for plasma welding and the negative terminal is electrically connected with the electrode of the torch for plasma welding, thereby generating a non-transferred plasma jet arc between the electrode and the insert chip, and
in the welding step, a current is supplied from the second power supply, which is the welding power supply used for the TIG welding apparatus, and in which the positive terminal is electrically connected with the material to be welded and the negative terminal is electrically connected with the electrode, while generating a transferred plasma arc between the material to be welded and the electrode by a high-frequency-start-type of a high-frequency device constituting the second welding power supply or by a high-voltage-start-type high-voltage device constituting the second welding power supply instead of the high-frequency device, thereby welding the material to be welded.

8. The plasma welding method according to claim 6, wherein
in the welding step, the material to be welded is welded in a state where the generation of the plasma jet arc is continuous.

9. The welding method according to claim 6, wherein the plasma jet arc is generated by supplying a current of 4 A to 500 A from the first welding power supply.

10. The plasma welding method according to claim 7, wherein
in the welding step, the material to be welded is welded in a state where the generation of the plasma jet arc is continuous.

11. The welding method according to claim 7, wherein the plasma jet arc is generated by supplying a current of 4 A to 500 A from the first welding power supply.

* * * * *